(12) United States Patent
Crete

(10) Patent No.: US 6,843,062 B2
(45) Date of Patent: Jan. 18, 2005

(54) FOOD CONTAINER HAVING A SEPARABLE REFRIGERANT SECTION

(76) Inventor: Raymonde Crete, 5215, Grand, Montréal, Qc (CA), H3X 3S3

(*) Notice: Subject to any disclaimer, the term of this patent is extended or adjusted under 35 U.S.C. 154(b) by 95 days.

(21) Appl. No.: 10/271,623

(22) Filed: Oct. 16, 2002

(65) Prior Publication Data

US 2004/0074242 A1 Apr. 22, 2004

Related U.S. Application Data

(60) Provisional application No. 60/329,875, filed on Oct. 18, 2001.

(51) Int. Cl.[7] .............................. B65B 63/08; F25D 3/08
(52) U.S. Cl. .......................................... 62/60; 62/457.2
(58) Field of Search ..................... 62/60, 457.7, 457.1, 62/457.2, 457.6, 371; 220/23.83, 23.86, 23.4, 23.6, 592.03, 592.06

(56) References Cited

U.S. PATENT DOCUMENTS

| | | | | |
|---|---|---|---|---|
| 3,859,819 A | * | 1/1975 | Kaplan | 62/371 |
| 4,287,943 A | | 9/1981 | Hotta | |
| 4,383,422 A | | 5/1983 | Gordon | |
| 4,741,176 A | | 5/1988 | Johnson | |
| 5,307,647 A | * | 5/1994 | McClure | 62/371 |
| 5,701,757 A | * | 12/1997 | Heverly | 62/457.2 |
| 5,890,613 A | * | 4/1999 | Williams | 220/23.4 |

* cited by examiner

*Primary Examiner*—Chen Wen Jiang

(57) ABSTRACT

A food container having a separable refrigerant section has a container part having an open upper end and a lower end with a bottom. A separable lid configured and sized to sealingly and releasably engage the open upper end of the container part. A refrigerant section has a top end and a bottom end with the top end being configured and sized to releasingly engage the lower end of the container part.

3 Claims, 4 Drawing Sheets b

US 6,843,062 B2

FOOD CONTAINER HAVING A SEPARABLE REFRIGERANT SECTION

This application claims the benefit of Provisional Application No. 60/329,875 filed Oct. 18, 2001.

BACKGROUND OF THE INVENTION

1. Field of the Invention

The invention relates to insulating containers and more particularity to containers incorporating a substance known to hold heat or cold for a long period of time.

2. Description of the Relevant Art

Thermos bottles and ice coolers have been known in the art for a long time. Smaller containers such as serving dish have also incorporated a separable section in which to put hot or cold water or ice. In recent years, several inventions related to beverage containers and incorporating "gel packs" have been introduced such as U.S. Pat. No. 4,383,422 by Gordon and U.S. Pat. No. 4,741,176 by Johnson. There is U.S. Pat. No. 4,287,943 by Masashi which discloses a box which contains an element made to receive hot or cold water which can be inserted inside the box and U.S. Pat. No. 5,701,757 by Heverly which discloses a container having a separable compartment in which can be introduced one or more gel packs.

None of the prior art offers a very simple three part container which can be cheaply manufactured to the point of being disposable with interchangeable parts to fit between different sized containers.

SUMMARY OF THE INVENTION

It is an object of this invention to provide an economical container that offers a means to keep its content cool for a prolonged period of time.

It is another object of this invention to provide for a modular construction that allows for the separation of the three components: the lid, the container and the refrigerant section.

It is yet another object of this invention to allow for two or more units to be stacked one on top of the other by inserting the bottom of the refrigerant section into the lid of the container below.

It is a further object of this invention to provide for containers sections to be shaped in a slightly fluted configuration so that when the refrigerant sections and the lids are removed, several empty containers can fit inside one another to reduce storage space.

It should be understood that this invention is not limited as to the size and shape of it's components and that the container part can be divided into compartments for use as dip dish while remaining inside the scope of a single invention.

DESCRIPTION OF THE DRAWINGS

FIGS. 5a and 5b Show examples of further embodiments.

DETAILED DESCRIPTION OF THE PREFERRED EMBODIMENTS

Figure 1:
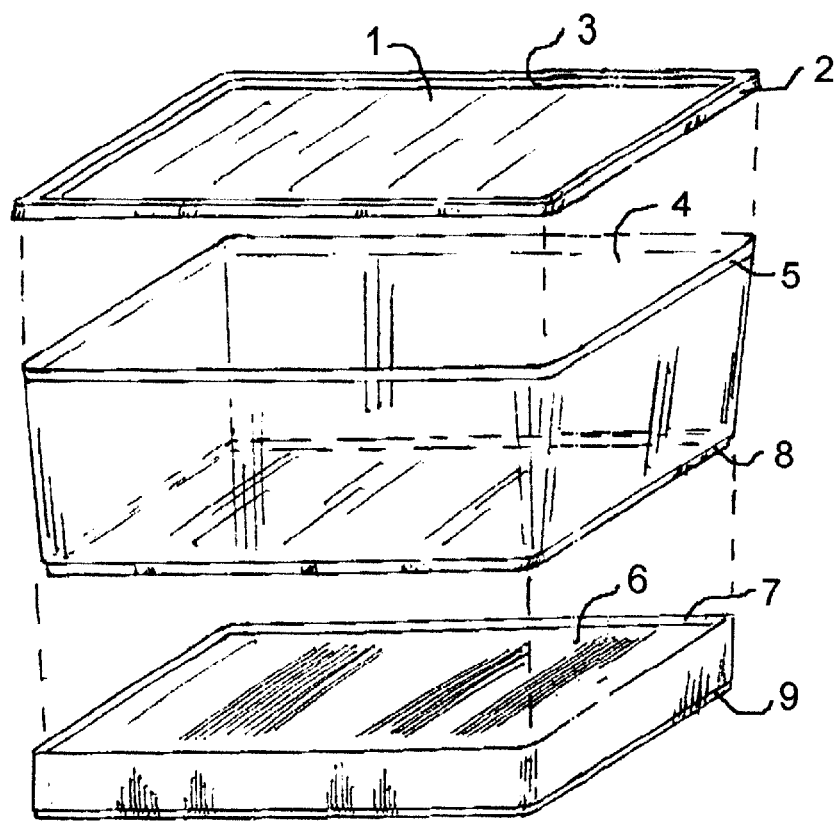
FIG. 1 Is an isometric view showing the three major parts separated.

FIG. 1 A container 10 has a separable lid 1 has an outside rabbet 2 and an inner cincture 3 both being around the periphery of the said separable lid 1 which can be sealably attached to a container part 4 at its upper end by way of a top sealing cincture 5 situated around the periphery of the said upper end of the said container part 4 which is generally positioned atop a refrigerant section 6 and said refrigerant section 6 is itself separable and can be sealably attached to the lower end of the container part 4 by way of a sealing rabbet 7 which cooperates with the bottom sealing cincture 8 of the container part 4.

To utilize the container 20, one must first place the refrigerant section 6 in the freezer to bring the refrigerant substance inside it down to a cold state. Once the user is ready to put food inside the container part 4, the lid 1 is sealably attached to the container 10, the refrigerant section 6 is taken out of the freezer and sealably attached to the bottom of the container part 4.

Figure 2:
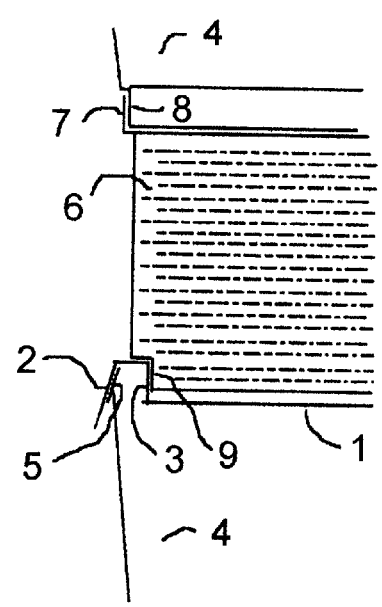
FIG. 2 Is a side elevation detail of the cinture and rabbet of the various components.

FIG. 2 In this side elevation we see in greater detail how the various parts cooperate. The refrigerant section 6—so called because it has a refrigerant substance integral to it much as a gel pack has a refrigerant substance integral to it within its containment—, has a refrigerant cincture 9 situated around the perimeter of its bottom and said refrigerant cincture 9 is sealably attached to the inner cincture 3 of the lid 1' of another container 4' on top of which the refrigerant section 6 is situated. The lid 1' is also sealably attached to the container 4' by way of cooperation between its outside rabbet 2' and the container's 4' top sealing cincture 5'. The top part of the refrigerant section 6 is, as described in FIG. 1, attached to the container 4 by way of cooperation between the sealing rabbet 7 and the bottom sealing cincture 8.

Figure 3:
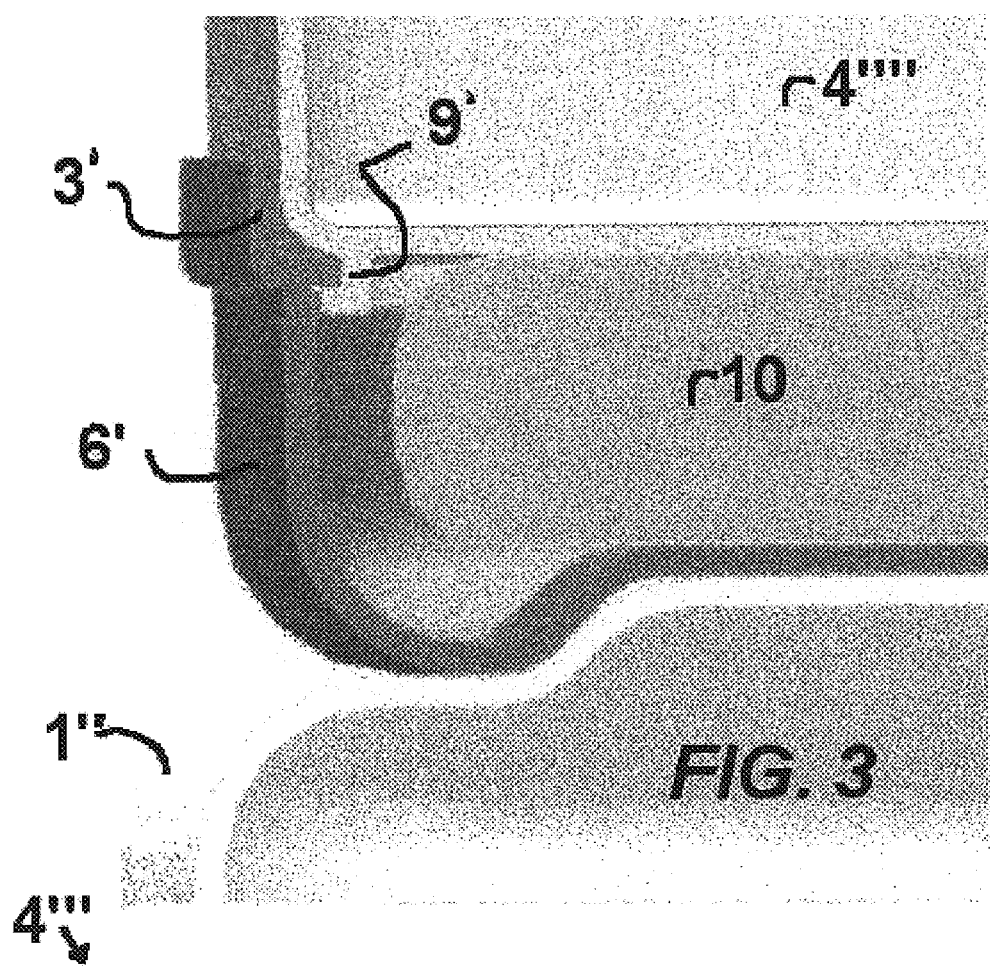
FIG. 3 Is a side elevation detail of the cinture and rabbet of an alternate embodiment of the various components.

FIG. 3 In an alternate embodiment, the refrigerant section 6' does not have a bottom sealing cincture but is rather configured and sized to releasably engage the lid 1" of the container 4" it is stacked on top of. The refrigerant section 6' has a refrigerant module 11 which is separable from the refrigerant section 6' and which can even be substituted with ice, liquids or other substances which can have the function of either absorbing heat or releasing heat. A "L" shaped refrigerant section inner cincture 3' is situated around the perimeter of the top of the refrigerant section 6' and is sealably attached to a "L" shaped bottom sealing cincture 9' of a container 4"".

Figure 4:
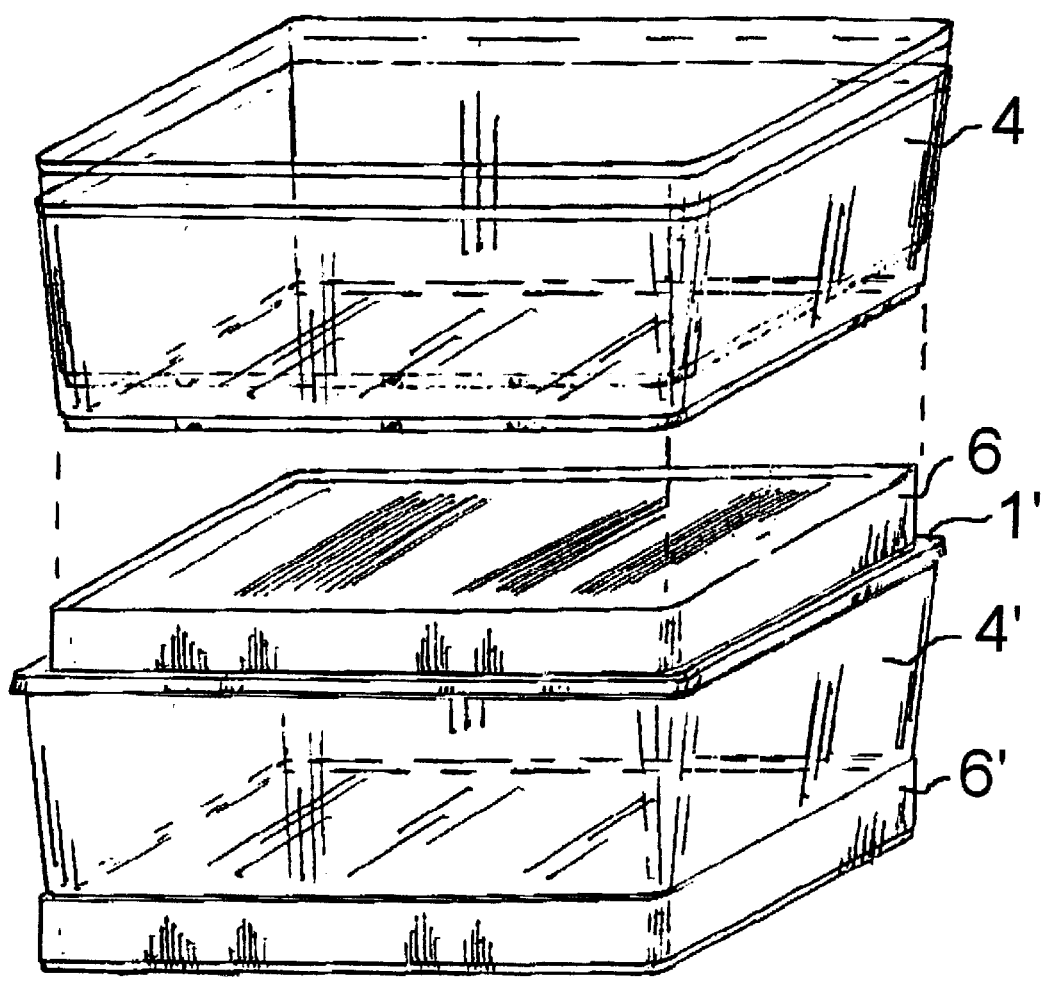
FIG. 4 Perspective view of two containers stacked.

FIG. 4 shows the ability of the containers 4 and 4' to stack up by having the refrigerant section 6 sandwiched between the bottom of the container 4 and the lid 1' of the container 4'. In this manner, the two containers 4 and 4' are engaged to each other in a way that makes them transportable as one. In the case of the second embodiment described in FIG. 3, although more than one container can be stacked, they are not engaged in a way that makes them one but rather loosely engaged to prevent lateral displacement but not vertical displacement, in other words, they are not as one.

Both embodiments, however fit inside one another. since they have sides which are shaped in a slightly fluted fashion. It should be understood that the food containers described herein can have a variety of sizes and shapes which can be rectangular, square, round, oval or any such shapes without departing from the scope of the present invention and further, each given shape can fit one inside the other for economy in storage space.

Figure 5A:
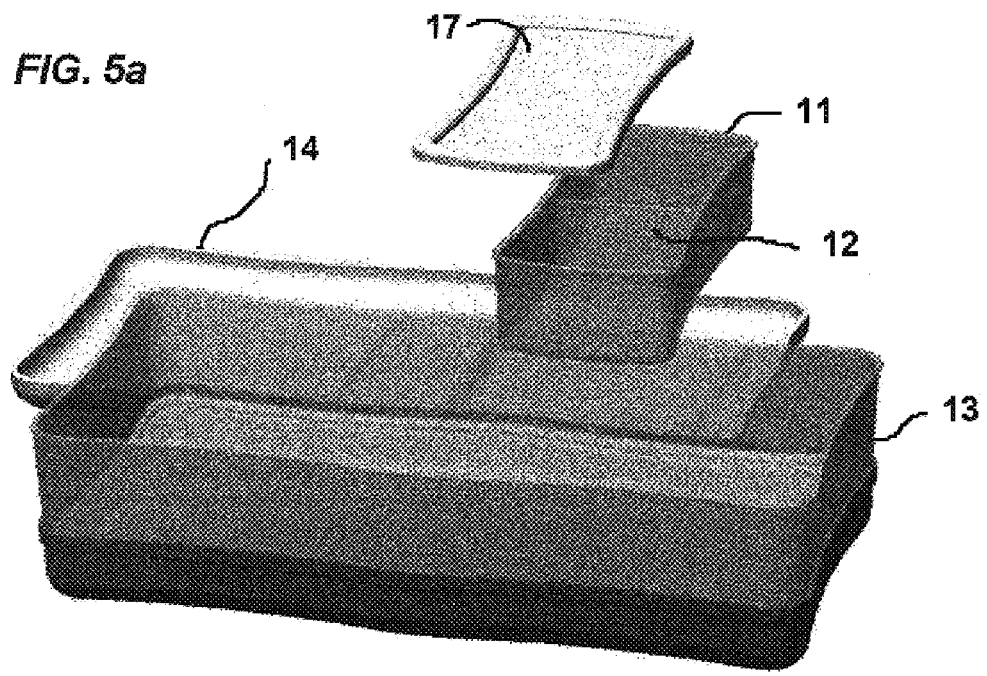
Figure 5A:
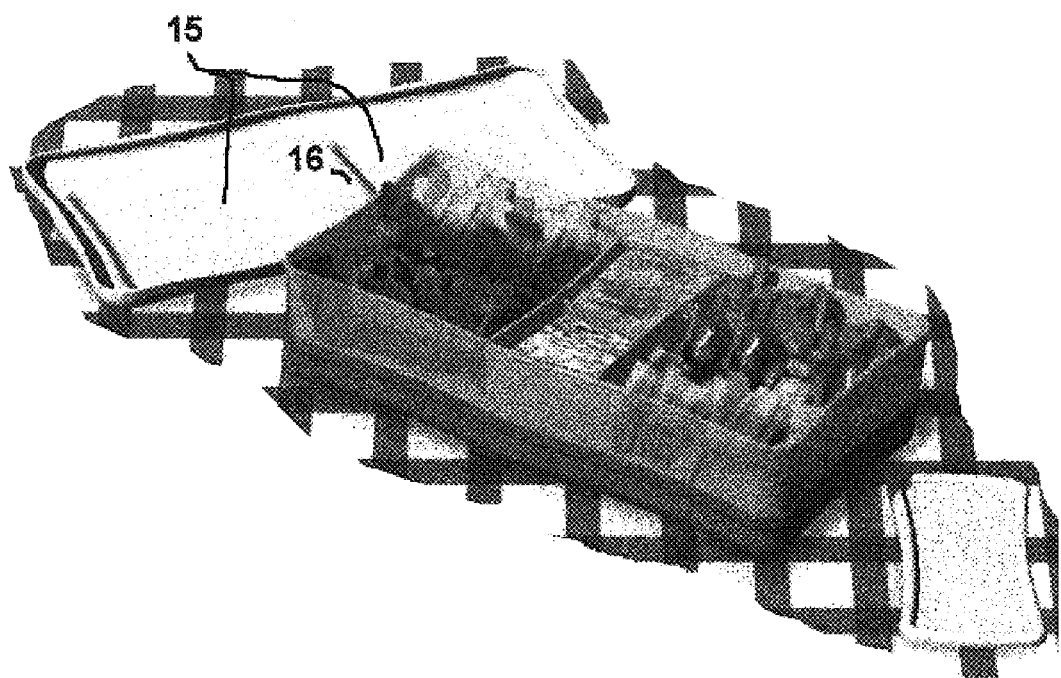

FIGS. 5a b shows further variations of the present invention wheras a small container 11 having a partitioning element 12 can fit inside a larger container 13, thus creating two partitions and with the shape of the large container lid 14, with its two elevated sections 15, (elevated as seen from the outside of the lid) separated by a depression 16

(depressed as seen from the outside of the lid) so that it insures that the small container 11 will not move laterally inside the larger container 13 when the large container lid 14 is fitted. This configuration can be used for dips where the sauces would be in the small container 11 and the dip food would be in the two partitions created inside the larger container 13. During transport or storage, a small container lid 17 is put on the small container 11 and the large container lid 14 is put on the large container 13.

What is claimed is:

1. A food container having a container part having an open upper end and a lower end with a bottom; a separable lid configured and sized to sealingly and releasably engage the open upper end of the container part; a separable refrigerant section having an top end and a bottom end and said top end being configured and sized to releasingly engage the lower end of the container part; and said bottom part configured and sized to mate with a complementarily configured and sized lid from another similar food container so that two or more similar food containers having refrigerant sections can be stacked one on top of the other and remain stacked with limited or no lateral movements; said food container having the following improvement:

an outside rabbet and an inner cincture both making the periphery of said separable lid and said separable lid being sealably attached to said container part by way of a top sealing cincture making the periphery of said upper end of said container part; said container part and said refrigerant section both being releasably engageable by way of said refrigerant section's own sealing rabbet situated on its top part which cooperates with a lower sealing cincture situated on said lower end of said container part; said refrigerant section having a refrigerant substance integrally therein.

2. A food container as in claim 1 wherein:

said refrigerant section having a refrigerant cincture situated around the perimeter of its bottom and said refrigerant cincture being sealably attached to said inner cincture of said lid of another container part on top of which said refrigerant section is situated.

3. A food container having a separable refrigerant section is used with the following method:

a refrigerant section is put in a freezer to bring a refrigerant substance inside to a cold state, once a user is ready to put food inside the container part, a lid is sealably attached on said container, said refrigerant section is taken out of said freezer and releasably attached to said container part;

said container part and said refrigerant section both being releasably engageable by way of said refrigerant section's own sealing rabbet situated on its top part which cooperates with a lower sealing cincture situated on said lower end of said container part.

* * * * *